United States Patent
Tsuchiya

(10) Patent No.: US 10,837,860 B2
(45) Date of Patent: Nov. 17, 2020

(54) LEAKED GAS DETECTION DEVICE AND LEAKED GAS DETECTION METHOD

(71) Applicant: KONICA MINOLTA, INC., Tokyo (JP)

(72) Inventor: Shinsuke Tsuchiya, Hachioji (JP)

(73) Assignee: KONICA MINOLTA, INC., Tokyo (JP)

( * ) Notice: Subject to any disclaimer, the term of this patent is extended or adjusted under 35 U.S.C. 154(b) by 318 days.

(21) Appl. No.: 15/766,935

(22) PCT Filed: Oct. 19, 2016

(86) PCT No.: PCT/JP2016/080955
§ 371 (c)(1),
(2) Date: Apr. 9, 2018

(87) PCT Pub. No.: WO2017/073426
PCT Pub. Date: May 4, 2017

(65) Prior Publication Data
US 2018/0292291 A1 Oct. 11, 2018

(30) Foreign Application Priority Data
Oct. 29, 2015 (JP) .................................. 2015-212505

(51) Int. Cl.
*G01M 3/38* (2006.01)
*G01M 3/00* (2006.01)

(52) U.S. Cl.
CPC .............. *G01M 3/38* (2013.01); *G01M 3/002* (2013.01)

(58) Field of Classification Search
CPC ................................ G01M 3/38; G01M 3/002
See application file for complete search history.

(56) References Cited

U.S. PATENT DOCUMENTS

| | | | | |
|---|---|---|---|---|
| 5,166,789 A | * | 11/1992 | Myrick | G01V 9/00 348/144 |
| 6,104,298 A | | 8/2000 | Flanders | |
| 6,995,846 B2 | * | 2/2006 | Kalayeh | G01N 21/39 356/437 |

(Continued)

FOREIGN PATENT DOCUMENTS

| | | |
|---|---|---|
| JP | 2001076268 A | 3/2001 |
| JP | 2013122389 A | 6/2013 |

OTHER PUBLICATIONS

International Search Report (ISR) dated Dec. 13, 2016 issued in International Application No. PCT/JP2016/080955.

(Continued)

*Primary Examiner* — Mohammad K Islam
(74) *Attorney, Agent, or Firm* — Holtz, Holtz & Volek PC

(57) ABSTRACT

A leaked gas detection device and a leaked gas detection method according to the present invention obtain a leakage position of a gas leaked into a space on the basis of an image of a target area, obtain a reliability degree that is an index representing the degree of reliability with respect to the obtained leakage position on the basis of data of a meteorological element, and display the obtained leakage position on a display unit in a range including the leakage position. At this time, the leaked gas detection device and the leaked gas detection method according to the present invention change a size of the range according to the obtained reliability degree.

20 Claims, 5 Drawing Sheets

820

| RELIABILITY DEGREE (%) 821 | NUMBER OF DIVISIONS 822 |
|---|---|
| 100 | 24×32 |
| 80 | 12×16 |
| 60 | 6×8 |
| 40 | 3×4 |
| 20 | ERROR (WARNING) |

(56) References Cited

U.S. PATENT DOCUMENTS

| | | | | |
|---|---|---|---|---|
| 7,855,367 | B2* | 12/2010 | Tolton | G01N 21/3518 250/338.5 |
| 2006/0238741 | A1* | 10/2006 | Ninomiya | G01J 3/36 356/5.01 |
| 2007/0087311 | A1* | 4/2007 | Garvey, III | G01J 5/025 434/21 |
| 2008/0237466 | A1* | 10/2008 | Key | G06T 7/0006 250/330 |
| 2011/0085030 | A1* | 4/2011 | Poe | F23N 5/08 348/61 |
| 2012/0314080 | A1* | 12/2012 | Lee | G01M 3/002 348/159 |
| 2015/0051883 | A1* | 2/2015 | Mano | G01S 7/412 703/2 |
| 2015/0323449 | A1* | 11/2015 | Jones | G01N 21/3103 356/437 |
| 2016/0097713 | A1* | 4/2016 | Kester | G01N 21/3504 356/51 |
| 2017/0097274 | A1* | 4/2017 | Thorpe | G06K 9/00201 |
| 2018/0110416 | A1* | 4/2018 | Masuda | A61B 5/015 |

OTHER PUBLICATIONS

Written Opinion dated Dec. 13, 2016 issued in International Application No. PCT/JP2016/080955.

* cited by examiner

FIG. 3

| | WIND SPEED (m/s) | |
| --- | --- | --- |
| | 0 TO 3 | 3 TO 15 |
| HUMIDITY (%) 0 TO 25 | 100% | 80% |
| 25 TO 50 | 80% | 60% |
| 50 TO 75 | 60% | 40% |
| 75 TO 100 | 40% | 20% |

FIG. 4

| RELIABILITY DEGREE (%) | NUMBER OF DIVISIONS |
| --- | --- |
| 100 | 24×32 |
| 80 | 12×16 |
| 60 | 6×8 |
| 40 | 3×4 |
| 20 | ERROR (WARNING) |

RELIABILITY DEGREE 60%

RELIABILITY DEGREE 40%

US 10,837,860 B2

LEAKED GAS DETECTION DEVICE AND LEAKED GAS DETECTION METHOD

TECHNICAL FIELD

The present invention relates to a leaked gas detection device and a leaked gas detection method for detecting a predetermined gas leaked into a space, and more particularly to a leaked gas detection device and a leaked gas detection method capable of displaying a leakage position in a display mode according to a reliability degree of the leakage position.

BACKGROUND ART

For example, when gases such as a flammable gas, a toxic gas, and vapor of an organic solvent are leaked from piping, tank, and the like, the leakage needs to cope with early. Therefore, devices for measuring a gas such as the leaked gas and displaying a measurement result are demanded. As such a device, for example, Patent Literature 1 discloses an abnormality detection device.

The abnormality detection device disclosed in Patent Literature 1 includes a plurality of visible light imaging units that images a place to be monitored, a display unit that displays an image signal, a processing unit that processes the image signal and detects abnormality occurring in the place to be monitored, and a display/abnormality detection switching unit that provides image signals from one or a plurality of imaging units, of the plurality of imaging units, to the display unit, and provides image signals from the remaining imaging units to the processing unit. The processing unit in the abnormality detection device obtains a difference between an image A and an image B shifted from the image A by a time Δt1 for each pixel, generates a binarized image by comparing each difference with a threshold, and obtains a change area between the image A and the image B in the binarized image as a change occurrence area and detects the abnormality, and the display unit displays the obtained change occurrence area (see FIG. 4 in Patent Literature 1).

By the way, to cope with the gas leakage, the position (leakage position) where the gas is leaked needs to specify. When trying to obtain the leakage position from an image by image processing, for example, the state of the atmosphere such as air temperature or rainfall influences as disturbance. Therefore, there are a case where the leakage position can be relatively accurately obtained (the error is small) and a case where the leakage position cannot be accurately obtained (the error is large). In the case where the obtained leakage position contains a relatively large error due to the disturbance and is not relatively accurate, if the leakage position is displayed as it is, a worker who has arrived at the site of the obtained leakage position needs to search for the leakage position because the gas supposed to leak is not leaked at the position because the leakage position is separated from a true leakage position, and a time is required to cope with the leakage. Further, in the case where the processing of obtaining the leakage position is repeated and the leakage position cannot be relatively accurately obtained due to the disturbance, the leakage position varies in each processing and is displayed at various positions. Therefore, the display flickers.

Further, Patent Literature 1 does not assume or suggest the case where the leakage position cannot be relatively accurately obtained.

CITATION LIST

Patent Literature

Patent Literature 1: JP 2001-76268 A

SUMMARY OF INVENTION

The present invention has been made in view of the foregoing, and an objective is to provide a leaked gas detection device and a leaked gas detection method capable of displaying the reliability of the leakage position including the degree of error and capable of reducing flicker.

A leaked gas detection device and a leaked gas detection method according to the present invention obtain a leakage position of a gas leaked into a space on the basis of an image of a target area, obtain a reliability degree that is an index representing the degree of reliability with respect to the obtained leakage position on the basis of data of a meteorological element, and display the obtained leakage position on a display unit in a range including the leakage position. At this time, the leaked gas detection device and the leaked gas detection method according to the present invention change a size of the range according to the obtained reliability degree. Therefore, the leaked gas detection device and the leaked gas detection method according to the present invention can display the reliability of the leakage position including the degree of error, and can reduce the flicker.

BRIEF DESCRIPTION OF DRAWINGS

FIG. 3 is a diagram illustrating an example of a reliability degree table in the leaked gas detection device.

FIG. 4 is a diagram illustrating an example of a range size table in the leaked gas detection device.

DESCRIPTION OF EMBODIMENTS

Figure 1:
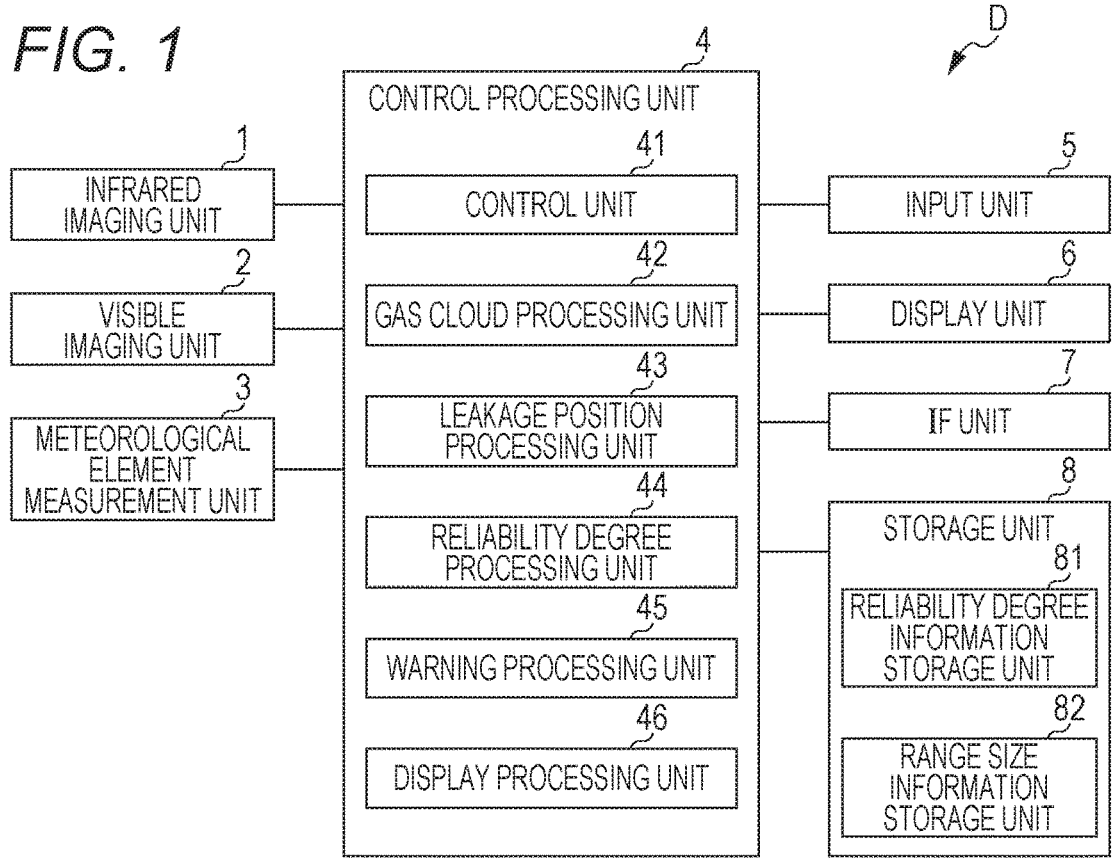
FIG. 1 is a block diagram illustrating a configuration of a leaked gas detection device in an embodiment.

Hereinafter, an embodiment of the present invention will be described with reference to the drawings. Note that configurations denoted by the same reference numeral in the drawings indicate the same configuration, and description thereof is omitted as appropriate. In the present specification, in the case of collectively referring to a configuration, a reference numeral without a suffix is denoted, and in the case of individually referring to a configuration, a reference numeral with a suffix is denoted.

Figure 2:
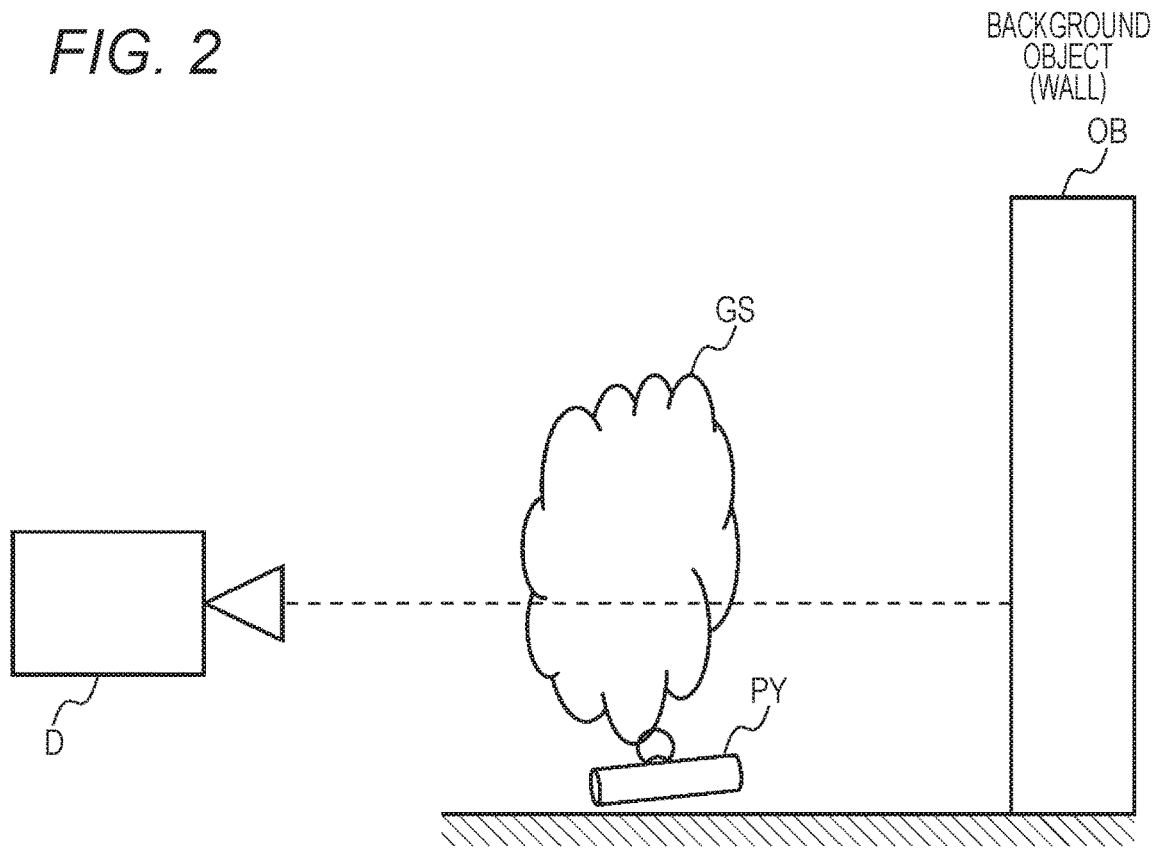
FIG. 2 is a schematic diagram for describing a use state of the leaked gas detection device.

FIG. 1 is a block diagram illustrating a configuration of a leaked gas detection device in an embodiment. FIG. 2 is a schematic diagram for describing a use state of the leaked gas detection device in the embodiment. FIG. 3 is a diagram illustrating an example of a reliability degree table in the leaked gas detection device of the embodiment. FIG. 4 is a diagram illustrating an example of a range size table in the leaked gas detection device of the embodiment.

The leaked gas detection device according to the embodiment is a device that obtains, from an image of a predetermined target area including a gas storage that stores a gas in a gas pipe (piping) and a gas tank, a leakage position of the gas leaked into a space from the gas storage, and displays the obtained leakage position. The leaked gas detection device in the embodiment displays the obtained leakage position in a range (area) including the leakage position on a display unit, and changes the size of the range according to a reliability degree that is an index representing the degree of reliability with respect to the leakage position. The reliability degree is preferably obtained on the basis of a measurement result of a predetermined meteorological element. More specifically, the leaked gas detection device in the embodiment includes an image acquisition unit that acquires an image of a target area, a meteorological element acquisition unit that acquires data related to a meteorological element, a leakage position processing unit that obtains a leakage position of a gas leaked into a space on the basis of the image of the target area acquired in the image acquisition unit, a reliability degree processing unit that obtains a reliability degree that is an index representing the degree of reliability with respect to the leakage position obtained in the leakage position processing unit on the basis of the meteorological element acquired in the meteorological element acquisition unit, and a display processing unit that makes the leakage position obtained in the leakage position processing unit displayable on a display unit in a range including the leakage position, wherein the display processing unit changes a size of the range according to the reliability degree obtained in the reliability degree processing unit. As illustrated in FIG. 1, a leaked gas detection device D in the present embodiment includes, for example, a control processing unit 4, an interface unit (IF unit) 7, and a storage unit 8, and further includes an infrared imaging unit 1, a visible imaging unit 2, a meteorological element measurement unit 3, an input unit 5, and a display unit 6, in the example illustrated in FIG. 1.

The infrared imaging unit 1 is a device connected to the control processing unit 4 and which images a target area in an infrared manner and generates an infrared image of the target area according to control of the control processing unit 4. The infrared imaging unit 1 is, for example, an infrared camera or the like including an imaging optical system that forms an infrared ray optical image (infrared optical image) of the target area on a predetermined image plane, an infrared image sensor disposed with a light receiving surface coincident with the image plane and which converts the infrared ray optical image of the target area into an electrical signal, an infrared image processing unit that generates data of the infrared image by image-processing an output of the infrared image sensor, and the like. The infrared imaging unit 1 outputs the infrared image (data of the infrared image) of the target area to the control processing unit 4.

The visible imaging unit 2 is a device connected to the control processing unit 4 and which images the target area in a visible manner and generates a visible image of the target area according to the control of the control processing unit 4. The visible imaging unit 2 is, for example, a visible camera or the like including an imaging optical system that forms an optical image (an optical image of visible light) of the target area on a predetermined image plane, an image sensor disposed with a light receiving surface coincident with the image plane and which converts the optical image of the target area into an electrical signal, a visible image processing unit that generates data of the visible image by image-processing an output of the image sensor, and the like. The visible imaging unit 2 outputs the visible image (data of the visible image) of the target area to the control processing unit 4.

The meteorological element measurement unit 3 is a device connected to the control processing unit 4 and which measures the predetermined meteorological element according to the control of the control processing unit 4. The meteorological element represents a state of the atmosphere (weather), and preferably includes one or a plurality of humidity, a rainfall amount, wind speed, a solar radiation amount, and air temperature. For example, in the case where the meteorological element is humidity (relative humidity or absolute humidity), the meteorological element measurement unit 3 includes a hygrometer. Further, for example, in the case where the meteorological element is the rainfall amount, the meteorological element measurement unit 3 includes a rain gauge. Further, for example, in the case where the meteorological element is the wind speed, the meteorological element measurement unit 3 includes an anemometer. Further, for example, in the case where the meteorological element is the solar radiation amount, the meteorological element measurement unit 3 includes a pyranometer. Further, for example, in the case where the meteorological element is the air temperature, the meteorological element measurement unit 3 includes a thermometer. In the present embodiment, the reliability degree is obtained on the basis of the relative humidity and the wind speed, as described below, and the meteorological element measurement unit 3 includes the hygrometer and the anemometer. The meteorological element measurement unit 3 outputs measurement results of the measured meteorological element (the relative humidity and the wind speed in the present embodiment) to the control processing unit 4.

The input unit 5 is a device connected to the control processing unit 4 and which inputs various commands such as a command instructing start of a detection operation to detect the leaked gas, and various data necessary to execute detection of the leaked gas such as an input of an identifier of the target area to the leaked gas detection device D. The input unit 5 is, for example, a plurality of input switches in which predetermined functions are allocated, a keyboard, or a mouse. The display unit 6 is a device connected to the control processing unit 4 and which outputs the command and data input from the input unit 5, the gas cloud detected by the leaked gas detection device D, the leakage position that is a position (place) where the gas is leaked, the reliability degree of the leakage position, a warning, and the like, by control of the control processing unit 4. The display unit 6 is a display device such as a cathode ray tube (CRT) display; a liquid crystal display, or an organic electroluminescence (EL) display.

Note that a touch panel may be constituted by the input unit 5 and the display unit 6. In constituting the touch panel, the input unit 5 is a position input device that detects and inputs an operation position, such as a resistive film-type or a capacitive-type position input device. The touch panel is provided with the position input device on a display surface of the display device, and one or a plurality of input content candidates inputtable to the display device are displayed. When a user touches a display position where the input content to be input is displayed, the position is detected by the position input device, and the display content displayed at the detected position is input to the leaked gas detection device D as operation input content of the user. In such a touch panel, the user can easily intuitively understand the input operation. Therefore, the leaked gas detection device D that is easy to handle for the user is provided.

The IF unit 7 is a circuit connected to the control processing unit 4 and which inputs/outputs data to/from an external device according to the control of the control processing unit 4. The IF unit 7 is, for example, an RS-232C interface circuit in a serial communication system, an interface circuit using the Bluetooth (registered trademark) standard, an interface circuit that performs infrared data association (IrDA)-standard infrared communication, an interface circuit using the universal serial bus (USB) standard, or the like. Further, the IF unit 7 is a communication card or the like that communicates by wired or wireless means, and may communicate with an external device such as a server device via a communication network such as an Ethernet environment (Ethernet is registered trademark).

The storage unit 8 is a circuit connected to the control processing unit 4 and which stores various predetermined programs and data according to the control of the control processing unit 4. The various predetermined programs include control processing programs such as a control program for controlling each unit of the leaked gas detection device D according to the function of the each unit, a gas cloud processing program for extracting a gas cloud image area of a gas cloud formed with a leaked gas leaked into a space from a gas storage on the basis of the infrared image of the target area generated in the infrared imaging unit 1, a leakage position processing program for obtaining the leakage position of the leaked gas leaked into the space from the gas storage on the basis of the infrared image of the target area generated in the infrared imaging unit 1, a reliability degree processing program for obtaining the reliability degree that is an index representing the degree of reliability with respect to the leakage position obtained by the leakage position processing program on the basis of the measurement results of the meteorological element measured in the meteorological element measurement unit 3, a display processing program for displaying the leakage position obtained by the leakage position processing program on the display unit 6 in the range (area) including the leakage position, and a warning processing program for giving, in the case where the reliability degree obtained by the reliability processing program is equal to or less than a predetermined threshold, a warning informing the fact that the reliability degree is equal to or less than the threshold. The various predetermined data include data necessary for executing the programs, such as a correspondence relationship (reliability degree correspondence relationship) between the measurement result of the meteorological element and the reliability degree, which is used for obtaining the reliability degree on the basis of the measurement result of the meteorological element measured in the meteorological element measurement unit 3, and a correspondence relationship (range size correspondence relationship) between the reliability degree and the size of the range, which is used for obtaining the size of the range for displaying the leakage position on the basis of the reliability degree. The storage unit 8 includes, for example, a read only memory (ROM) that is a nonvolatile storage element, an electrically erasable programmable read only memory (EEPROM) that is a rewritable nonvolatile storage element, and the like. The storage unit 8 includes a random access memory (RAM) that serves as so-called a working memory of the control processing unit 4, which stores data and the like generated during the execution of the predetermined programs. Note that the storage unit 8 may include a hard disk having a relatively large storage capacity.

The storage unit 8 functionally includes a reliability degree information storage unit 81 and a range size information storage unit 82 in order to store the reliability degree correspondence relationship and the range size correspondence relationship in advance.

The reliability degree information storage unit 81 stores the reliability degree correspondence relationship in advance. The reliability degree correspondence relationship is a correspondence relationship between the relative humidity and the wind speed in the present embodiment, and is stored in the reliability degree information storage unit 81 in advance in a table format. A reliability degree table 810 illustrating the correspondence relationship between the relative humidity and the wind speed, and the reliability degree is configured by, for example, registering each reliability degree corresponding to each humidity 812 and each wind speed 811 to each section in a two-dimensional matrix composed of rows of the humidity 812 and columns of the wind speed 811, as illustrated in FIG. 3. For example, the reliability degree of 100% corresponding to the case where the relative humidity is 0% or more and less than 25%, and the wind speed is 0 m/s or more and less than 3 m/s, is registered in a first-row and first column section, and the reliability degree of 40% corresponding to the case where the relative humidity is 50% or more and less than 75%, and the wind speed is 3 m/s or more and less than 15 m/s, is registered in a third-row and second column section.

Note that, in the case where the meteorological element is the humidity, the correspondence relationship between the humidity and the reliability degree is appropriately set in advance such that the reliability degree becomes smaller as the humidity becomes higher. In the case where the meteorological element is the rainfall amount, the correspondence relationship between the rainfall amount and the reliability degree is appropriately set in advance such that the reliability degree becomes smaller as the rainfall amount becomes larger. In the case where the meteorological element is the wind speed, the correspondence relationship between the wind speed and the reliability degree is appropriately set in advance such that the reliability degree becomes smaller as the wind speed becomes faster. In the case where the meteorological element is the solar radiation amount, the correspondence relationship between the solar radiation amount and the reliability degree is appropriately set in advance such that the reliability degree becomes smaller as the solar radiation amount becomes smaller. In the case where the meteorological element is the air temperature, the correspondence relationship between the difference on the basis of the air temperature and the background temperature of the gas cloud formed with the leaked gas, and the reliability degree is appropriately set in advance such that the reliability degree becomes smaller as the difference between the background temperature and the air temperature becomes smaller.

The range size information storage unit 82 stores the range size correspondence relationship in advance. In the range size correspondence relationship, the size of the range appropriately corresponds to the reliability degree such that the size of the range becomes larger as the reliability degree becomes lower in the present embodiment. The range size correspondence relationship is stored in the range size information storage unit 82 in advance in a table format. In the present embodiment, the size of the range is expressed by the number of divisions obtained by dividing the entire screen. As illustrated in FIG. 4, a range size table 820 illustrating the correspondence relationship between the reliability degree and the size of the range includes, for example, a reliability degree field 821 in which the reliability degree is registered, and the number of divisions field 822 in which the number of divisions corresponding to the reliability degree registered in the reliability degree field 821 is registered, and has a record for each reliability degree. For example, the reliability degree of 100% is registered in the reliability degree field 821 in the record of the first row, and 24×32 (a vertical length in a vertical direction of the screen is equally divided into 24 and a horizontal length in a horizontal direction of the screen is equally divided into 32, and as a result, the entire screen is equally divided into 24×32=768) is registered in the number of divisions field 822 corresponding the reliability degree. In this case, the size of the range is the size of one section in the case where the entire screen is equally divided into 768 sections. Further, for example, the reliability degree of 20% is registered in the reliability degree field 821 in the record of the fifth row, and an error (warning) is registered in the number of divisions field 822 corresponding to the reliability degree. In this case, an error is displayed. In the present embodiment, a warning is executed as error display as described below.

Referring back to FIG. 1, the control processing unit 4 is a circuit for controlling the units of the leaked gas detection device D according to respective functions of the units, detecting the leakage position of the leaked gas leaked into the space from the gas storage, obtaining the degree of reliability with respect to the leakage position, and displaying the leakage position, and its reliability degree and warning. The control processing unit 4 includes, for example, a central processing unit (CPU) and a peripheral circuit thereof. In the control processing unit 4, a control unit 41, a gas cloud processing unit 42, a leakage position processing unit 43, a reliability degree processing unit 44, a warning processing unit 45, and a display processing unit 46 are functionally configured by execution of the control processing program.

The control unit 41 is for controlling each unit of the leaked gas detection device D according to the function of each unit. The control unit 41 acquires the measurement results of the measured meteorological element (the relative humidity and the wind speed in the present embodiment) from the meteorological element measurement unit 3.

The gas cloud processing unit 42 extracts the gas cloud image area of the gas cloud formed with the leaked gas leaked into the space from the gas storage on the basis of the infrared image of the target area generated in the infrared imaging unit 1.

Here, for example, as illustrated in FIG. 2, the leaked gas detection device D in the present embodiment is fixedly arranged to cause a capturing direction of the infrared imaging unit 1 and a capturing direction of the visible imaging unit 2 to face the target area so that the infrared image and the visible image in the target area can be respectively imaged by the infrared imaging unit 1 and the visible imaging unit 2. The infrared imaging unit 1 arranged in this manner images infrared rays (background radiation infrared rays and background emission infrared rays) radiated (emitted) by an individual object (background object) OB existing in the target area. As illustrated in FIG. 2, when a gas is leaked from a gas storage PY such as piping, and a gas cloud GS of the leaked gas exists between the infrared imaging unit 1 and the background object OB, the background radiation infrared rays reach the infrared imaging unit 1 via the gas cloud GS. The gas cloud GS absorbs a part of the background radiation infrared rays at a wavelength of an absorption line specific to the gas, and radiates infrared rays according to the temperature of the gas cloud GS itself. An amount of absorption with respect to the background radiation infrared rays depends on the concentration of the gas cloud GS, and then depends on the thickness of the gas cloud GS, and therefore depends on the concentration-thickness product of the gas cloud GS. Therefore, in the infrared image of the target area imaged and generated by the infrared imaging unit 1, a luminance value of a partial image via the gas cloud GS is different from a luminance value of a partial image without via the gas cloud GS. Therefore, the gas cloud processing unit 42 can extract the gas cloud image area of the gas cloud GS by extracting an area of pixels having a variation amount of the luminance value per unit time, which is equal to or less than a preset predetermined determination threshold Dth from the infrared image of the target area, for example.

The leakage position processing unit 43 obtains the leakage position of the leaked gas leaked into the space from the gas storage unit on the basis of the infrared image of the target area generated in the infrared imaging unit 1. The leakage position processing unit 43 can estimate the leakage position by tracing back a plurality of gas cloud image areas continuous in a time series. Further, for example, the leakage position processing unit 43 can estimate the leakage position by obtaining a plurality of optical flows in the gas cloud GS on the basis of a plurality of gas cloud image areas continuous in time series and tracing back the plurality of optical flows.

The reliability degree processing unit 44 obtains the reliability degree that is an index representing the degree of reliability for the leakage position obtained by the leakage position processing unit 43 on the basis of the measurement result of the meteorological element measured in the meteorological element measurement unit 3. More specifically, in the present embodiment, the reliability degree processing unit 44 obtains the reliability degree corresponding to the relative humidity and the wind speed measured in the meteorological element measurement unit 3 from the reliability degree table 810 stored in the reliability degree information storage unit 81. For example, in the case where the relative humidity is 45% and the wind speed is 1 m/s, the reliability degree processing unit 44 obtains the reliability of 80% from the reliability degree table 810.

The warning processing unit 45 gives, when the reliability degree obtained in the reliability degree processing unit 44 is equal to or less than a predetermined threshold, a warning informing that the reliability degree is equal to or less than the threshold. More specifically, in the present embodiment, in the case where the reliability degree obtained by the reliability degree processing unit 44 is equal to or less than 20%, the warning processing unit 45 causes the display processing unit 46 to display an error displaying that the reliability degree is equal to or less than the threshold (20% in this example) such as "calculation of the reliability degree is error" on the display unit 6.

The display processing unit 46 displays, on the display unit 6, the visible image of the target area generated in the visible imaging unit 2, the gas cloud image area extracted in the gas cloud processing unit 42, the leakage position obtained in the leakage position processing unit 43, the reliability degree obtained in the reliability degree processing unit 44, and the warning determined in the warning processing unit 45, as needed. More specifically, the display processing unit 46 superimposes the gas cloud image area extracted in the gas cloud processing unit 42 on the visible image of the target area generated in the visible imaging unit 2 and displays the superimposed image on the display unit 6, makes the leakage position obtained in the leakage position processing unit 43 displayable on the display unit 6 in a range including the leakage position and displays the reliability degree with respect to the leakage position on the display unit 6 by changing the size of the range according to the reliability degree obtained in the reliability degree processing unit 44. More specifically, regarding the display of the leakage position and the reliability degree, the display processing unit 46 obtains the size of the range corresponding to the reliability degree obtained in the reliability degree processing unit 44 from the range size table 820 stored in the range size information storage unit 82, and displays the range including the leakage position on the display unit 6 with the obtained size of the range. For example, in the case where the reliability degree is 80%, the display processing unit 46 obtains the number of divisions of 12×16=192 from the range size table 820, and obtains one section of the case where the entire screen is equally divided into 192 by equally dividing the vertical length in the vertical direction into 12 and equally dividing the horizontal length in the horizontal direction into 16, of the size of the range. In the range size table 820, the size of the range corresponds to the reliability degree such that the size of the range becomes larger as the reliability degree becomes lower. Therefore, the display processing unit 46 changes the size of the range such that the size of the range becomes larger as the reliability degree obtained in the reliability degree processing unit 44 becomes lower. Further, in the case where the warning is required as a result of determination about necessity of warning by the warning processing unit 45, the display processing unit 46 displays "calculation of the reliability degree is error" or the like on the display unit 6, as described above.

Note that, in the above description, the infrared imaging unit 1, the visible imaging unit 2, the meteorological element measurement unit 3, the control processing unit 4, the input unit 5, the display unit 6, the IF unit 7, and the storage unit 8 may be put together as one unit to constitute a main unit, and the leaked gas detection device D. In this case, the infrared imaging unit 1 corresponds to an example of an image acquisition unit that acquires an image of the target area, and the meteorological element measurement unit 3 corresponds to an example of a meteorological element acquisition unit that acquires data related to a meteorological element. Alternatively, the infrared imaging unit 1, the visible imaging unit 2, and the meteorological element measurement unit 3 may be put together as one unit to constitute a sensor unit, and the control processing unit 4, the input unit 5, the display unit 6, the IF unit 7, and the storage unit 8 may be put together as one unit to constitute a main unit, and the leaked gas detection device D may be constituted by including the sensor unit and the main unit communicatively connected by wired or wireless means. In this case, the IF unit 7 corresponds to another example of an image acquisition unit that acquires an image of the target area, and further corresponds to another example of a meteorological element acquisition unit that acquires data related to the meteorological element. Then, in these cases, to enable monitoring at a remote place, the display unit 6 may be further separated and arranged at a remote place in a state of being communicatively connected by wired or wireless means.

Figure 5:
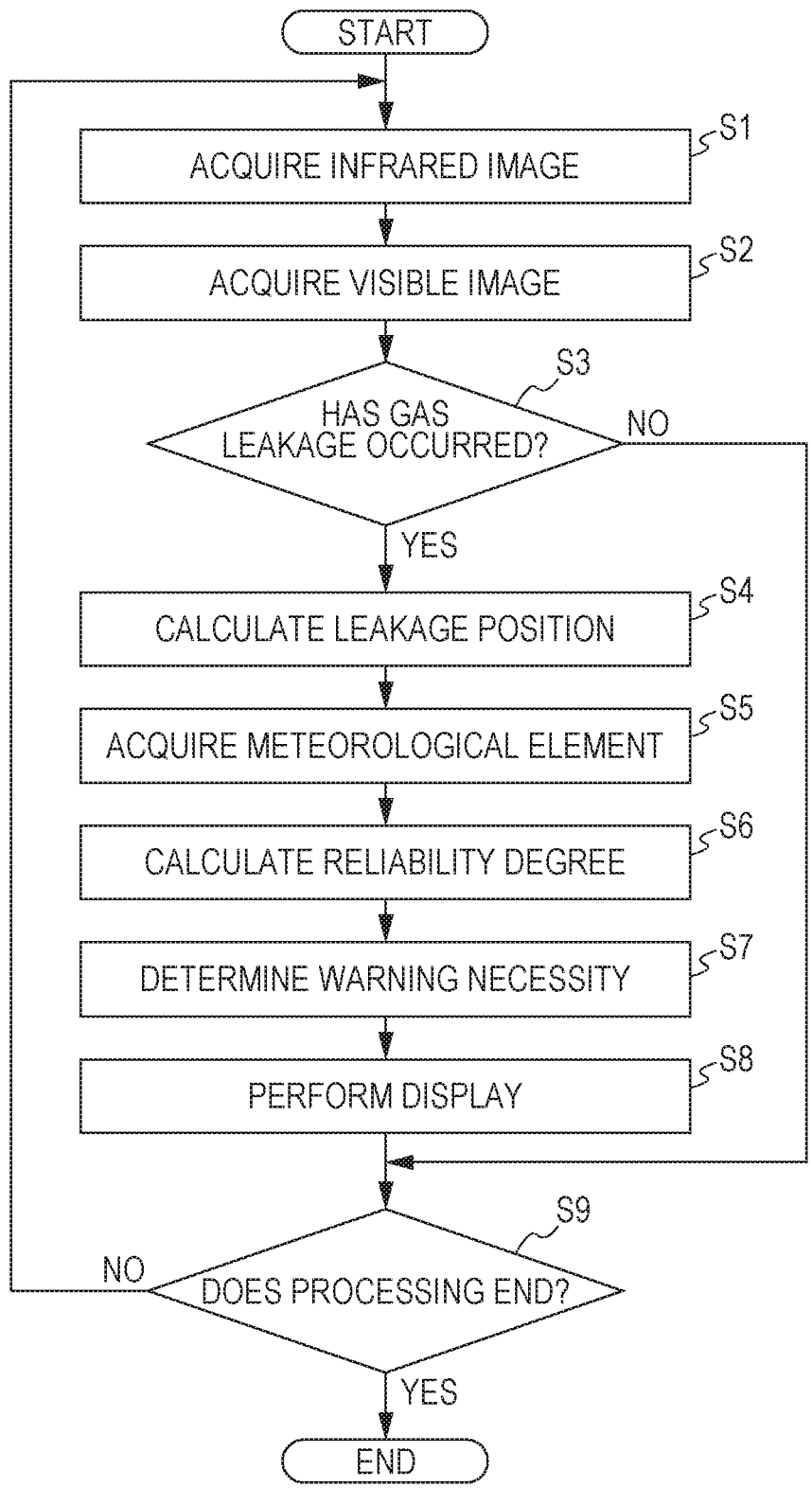
FIG. 5 is a flowchart illustrating an operation attic leaked gas detection device.
Figure 6:
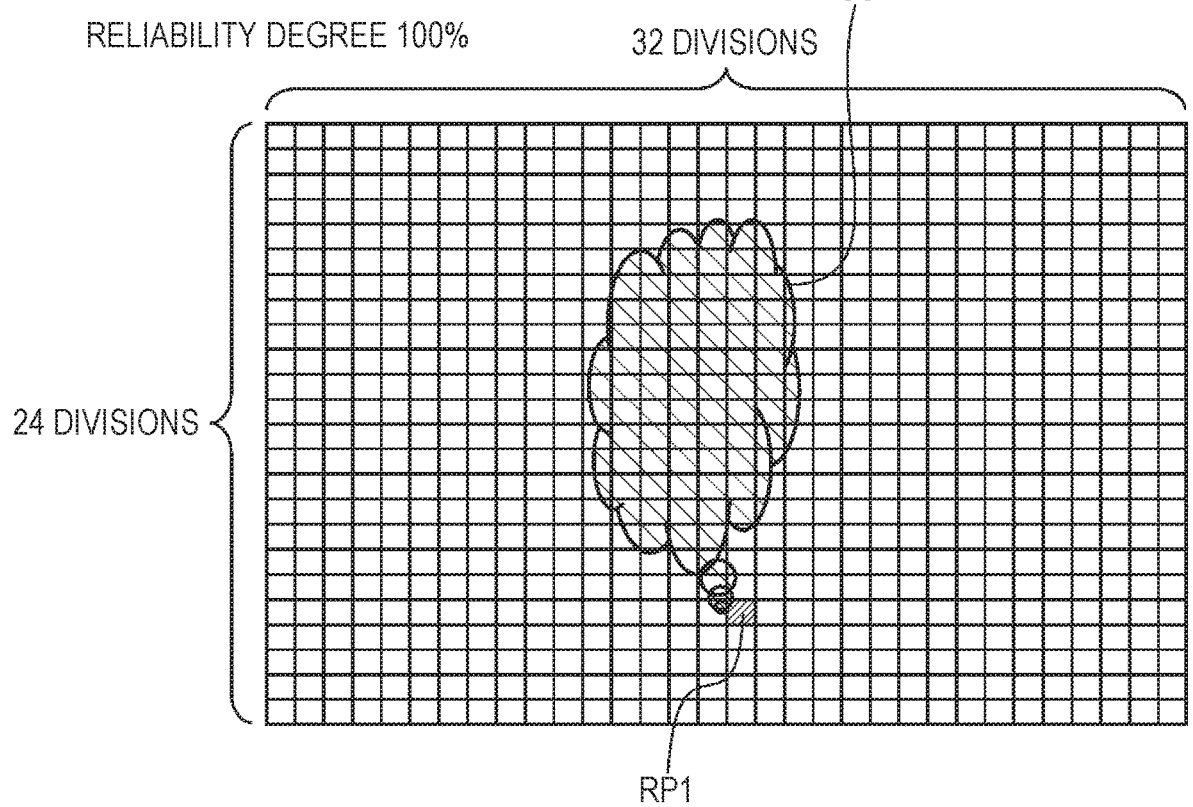
FIG. 6 is a schematic diagram for describing a display mode of a leakage position of a case where the reliability degree is 100% in the leaked gas detection device.
Figure 7:
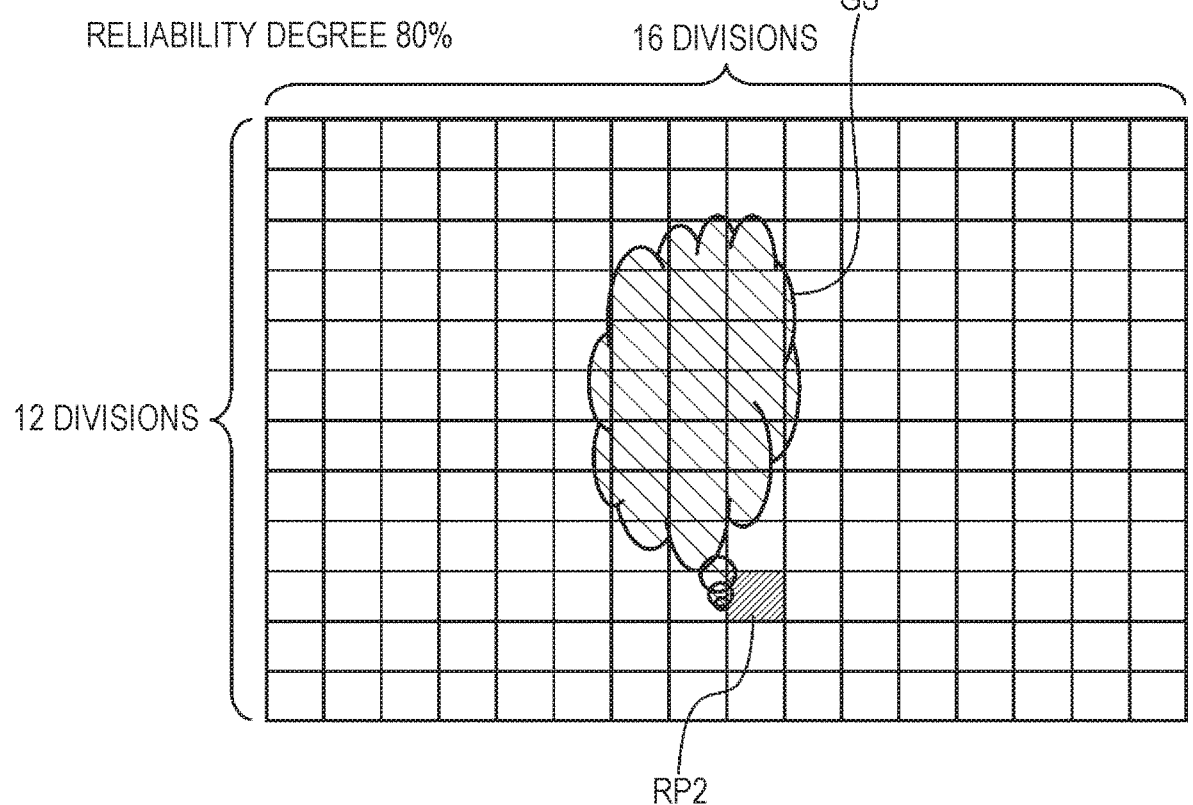
FIG. 7 is a schematic diagram for describing a display mode of a leakage position of a case where the reliability degree is 80% in the leaked gas detection device.
Figure 8:
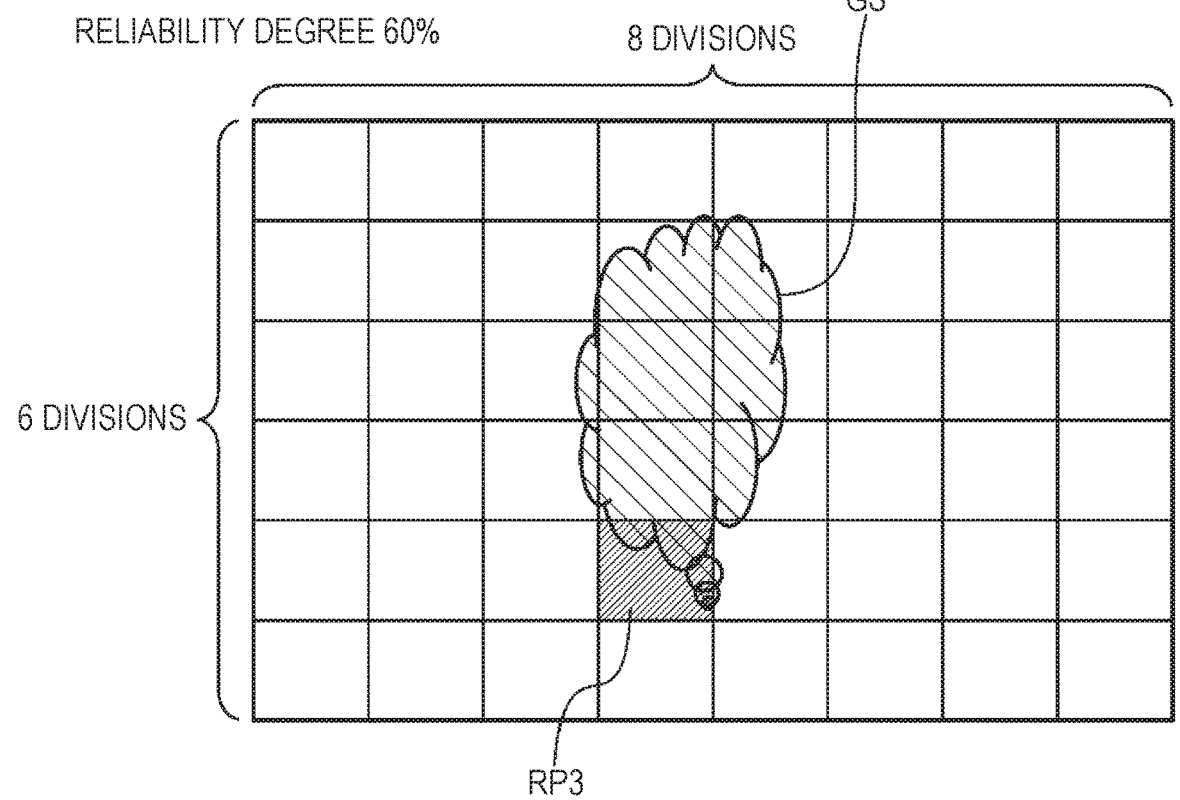
FIG. 8 is a schematic diagram for describing a display mode of a leakage position of a case where the reliability degree is 60% in the leaked gas detection device.
Figure 9:
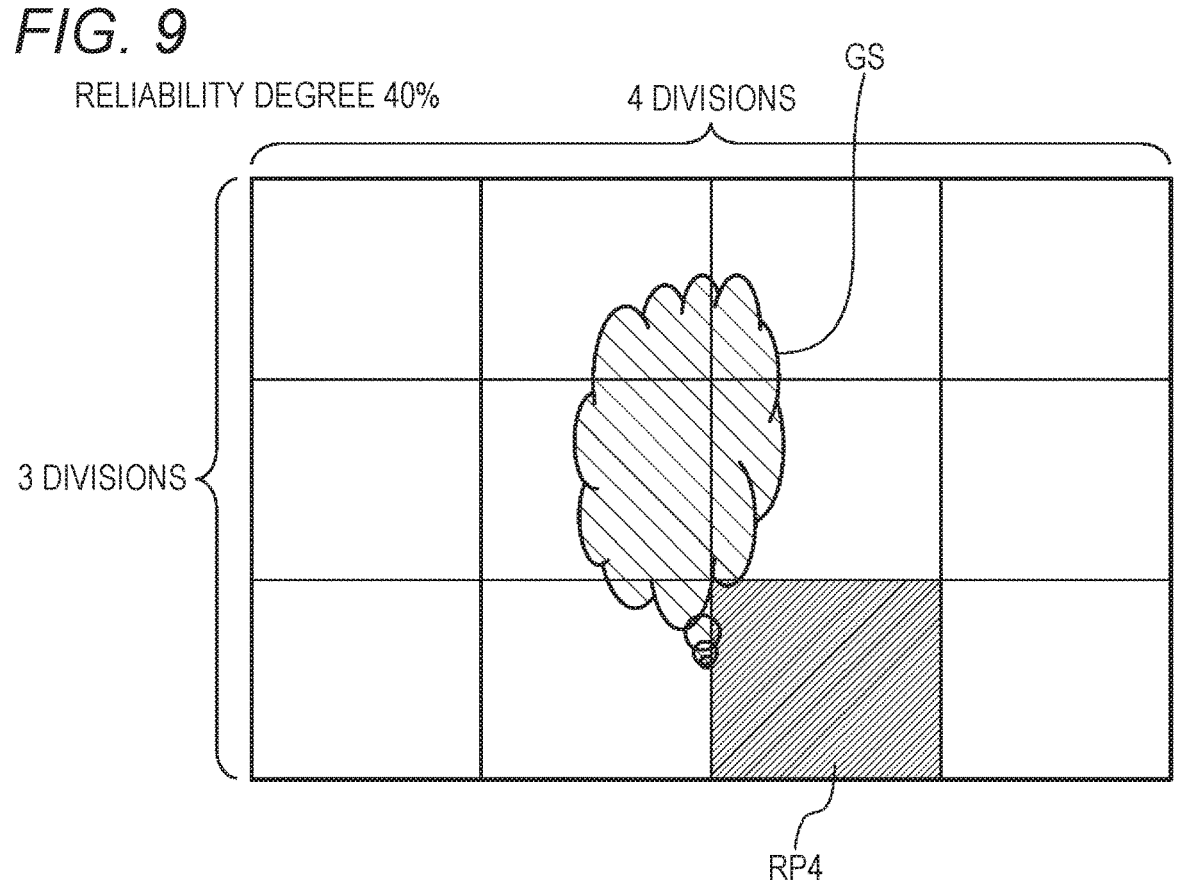
FIG. 9 is a schematic diagram for describing a display mode of a leakage position of a case where the reliability degree is 40% in the leaked gas detection device.

Next, an operation of the present embodiment will be described. FIG. 5 is a flowchart illustrating an operation of the leaked gas detection device in the embodiment. FIG. 6 is a schematic diagram for describing a display mode of the leakage position of the case where the reliability degree is 100% in the leaked gas detection device of the embodiment. FIG. 7 is a schematic diagram for describing a display mode of the leakage position of the case where the reliability degree is 80% in the leaked gas detection device of the embodiment. FIG. 8 is a schematic diagram for describing a display mode of the leakage position of the case where the reliability degree is 60% in the leaked gas detection device of the embodiment. FIG. 9 is a schematic diagram for describing a display mode of the leakage position of the case where the reliability degree is 40% in the leaked gas detection device of the embodiment.

The leaked gas detection device D is disposed to cause the capturing direction of the infrared imaging unit 1 and the capturing direction of the visible imaging unit 2 to face the target area, and when a power switch (not illustrated) is turned on by the user (operator), the control processing unit 4 executes initialization of necessary units, and by execution of the control processing program, the control unit 41, the gas cloud processing unit 42, the leakage position processing unit 43, the reliability degree processing unit 44, the warning processing unit 45, and the display processing unit 46 are functionally configured in the control processing unit 4. When the start of the detection operation is input and instructed from the input unit 5 by the user, the detection operation of the gas is started for the target area.

More specifically, in FIG. 5, first, the leaked gas detection device D images, by the infrared imaging unit 1, the target area in an infrared manner, and generates and acquires the infrared image of the target area. The infrared image (image data of the infrared image) of the target area is output from the infrared imaging unit 1 to the control processing unit 4 (S1).

Next, the leaked gas detection device D images, by the visible imaging unit 2, the target area in a visible manner, and generates and acquires the visible image of the target area. The visible image (image data of the visible image) of the target area is output from the visible imaging unit 2 to the control processing unit 4 (S2).

Next, the leaked gas detection device D determines, by the control processing unit 4, whether the gas cloud GS formed with the leaked gas leaked from the gas storage has occurred in the space of the target area (S3). To detect the gas leakage, the presence of the gas leakage can be determined by processing S3 by assuming that the gas cloud GS is formed with the leaked gas. More specifically, the control processing unit 4 extracts, by the gas cloud processing unit 42, the gas cloud image area of the gas cloud GS on the basis of the infrared image of the target area generated in the infrared imaging unit 1. As a result, when the gas cloud image area is not extracted (No), the control processing unit 4 determines that the gas cloud GS has not occurred and executes the processing S9 described below. Meanwhile, when the gas cloud image area is extracted (Yes), the control processing unit 4 determines that the gas cloud GS has occurred and executes the next processing S4.

In the processing S4, the leaked gas detection device D obtains, by the leakage position processing unit 43, the leakage position of the leaked gas leaked into the space from the gas storage unit on the basis of the infrared image of the target area generated in the infrared imaging unit 1.

Next, the leaked gas detection device D acquires, by the control unit 41, the measurement results of the measured meteorological element (the relative humidity and the wind speed in the present embodiment) from the meteorological element measurement unit 3. (S5).

Next, the leaked gas detection device D obtains, by the reliability degree processing unit 44, the reliability degree with respect to the leakage position obtained by the leakage position processing unit 43 on the basis of the measurement results of the meteorological element measured in the meteorological element measurement unit 3 (S6). More specifically, the reliability degree processing unit 44 obtains the reliability degree corresponding to the relative humidity and the wind speed measured in the meteorological element measurement unit 3 from the reliability degree table 810 stored in the reliability degree information storage unit 81.

Next, the leaked gas detection device D determines necessity of warning by the warning processing unit 45 (S7). More specifically, the warning processing unit 45 determines necessity of warning by determining whether the reliability degree obtained in the reliability degree processing unit 44 is equal to or less than the threshold, and determines that the warning is necessary when the reliability degree obtained in the reliability degree processing unit 44 is equal to or less than the threshold and determines that the warning is not necessary when the reliability degree obtained in the reliability degree processing unit 44 exceeds the threshold.

Next, the leaked gas detection device D displays, by the display processing unit 46, the visible image of the target area generated in the visible imaging unit 2, the gas cloud image area extracted in the gas cloud processing unit 42, the leakage position obtained in the leakage position processing unit 43, the reliability degree obtained in the reliability degree processing unit 44, and the warning determined in the warning processing unit 45, on the display unit 6 (S8). More specifically, the display processing unit 46 superimposes the gas cloud image area extracted in the gas cloud processing unit 42 on the visible image of the target area generated in the visible imaging unit 2 and displays the superimposed image on the display unit 6, displays the leakage position obtained in the leakage position processing unit 43 on the display unit 6 in a range including the leakage position, and displays the reliability degree with respect to the leakage position on the display unit 6 by changing the size of the range according to the reliability degree obtained in the reliability degree processing unit 44.

More specifically, regarding the display of the leakage position and the reliability degree, the display processing unit 46 obtains the size of the range corresponding to the reliability degree obtained in the reliability degree processing unit 44 from the range size table 820 stored in the range size information storage unit 82, and displays the range including the leakage position on the display unit 6 with the obtained size of the range. For example, in the case where the reliability degree is obtained as 100% in the processing S6, the display processing unit 46 obtains the number of divisions of 24×32=768 from the range size table 820, and displays a leakage position RP1 on the display unit 6 by the size of the range, which is one section of when the entire screen is equally divided into 768 by equally dividing the vertical length in the vertical direction into 24 and equally dividing the horizontal length in the horizontal direction into 32, as illustrated in FIG. 6. Further, for example, in the case where the reliability degree is obtained as 80% in the processing S6, the display processing unit 46 obtains the number of divisions of 12×16=192 from the range size table 820, and displays a leakage position RP2 on the display unit 6 by the size of the range, which is one section of when the entire screen is equally divided into 192 by equally dividing the vertical length in the vertical direction into 12 and equally dividing the horizontal length in the horizontal direction into 16, as illustrated in FIG. 7. For example, in the case where the reliability degree is obtained as 60% in the processing S6, the display processing unit 46 obtains the number of divisions of 6×8=48 from the range size table 820, and displays a leakage position RP3 on the display unit 6 by the size of the range, which is one section of when the entire screen is equally divided into 48 by equally dividing the vertical length in the vertical direction into 6 and equally dividing the horizontal length in the horizontal direction into 8, as illustrated in FIG. 8. Further, for example, in the case where the reliability degree is obtained as 40% in the processing S6, the display processing unit 46 obtains the number of divisions of 3×4=12 from the range size table 820, and displays a leakage position RP4 on the display unit 6 by the size of the range, which is one section of when the entire screen is equally divided into 12 by equally dividing the vertical length in the vertical direction into 3 and equally dividing the horizontal length in the horizontal direction into 4, as illustrated in FIG. 9. Display of the leakage position RP is performed by displaying a contour of the range in a predetermined color (red or orange, for example), blinking the entire range, or hatching the range (for example, shading or diagonal lines). Note that the boundary (grid) line of each section may be displayed on the display unit 6 by a predetermined line types such as thin line and broken line. Further, in the case where the warning is required as a result of determination about necessity of warning by the warning processing unit 45, the display processing unit 46 displays "calculation of the reliability degree is error" or the like on the display unit 6 (illustration is omitted).

Referring back to FIG. 5, in processing S9, the leaked gas detection device D determines, by the control processing unit 4, whether termination of the detection operation by the user has been received in the input unit 5, and terminates the processing when the termination of the detection operation has been received in the input unit 5 (Yes), and returns the processing to processing S1 when the termination of the detection operation has not been received in the input unit 5 (No).

As described above, the leaked gas detection device D in the present embodiment and the leaked gas detection method incorporated therein displays the leakage position obtained in the leakage position processing unit 43 in the range (area) including the leakage position, and further changes the size of the range according to the reliability degree. Therefore, the above-described leaked gas detection device D and the leaked gas detection method displays the leakage position in the range and thus can reduce the flicker, and can display the reliability degree of the leakage position including the degree of error (the difference between the true leakage position and the obtained leakage position) with the size of the range. Therefore, the user can more easily recognize the reliability of the leakage position including the degree of error with visual recognition in the size of the range, and can make a more appropriate judgment as to whether to rush to the site or whether to wait and see according to the reliability degree.

The leakage position obtained in the leakage position processing unit varies as the reliability degree becomes lower. The leaked gas detection device D and the leaked gas detection method make the size of the range larger as the reliability degree obtained in the reliability degree processing unit 44 becomes lower, and thus can reduce the flicker.

Since the leaked gas detection device D and the leaked gas detection method further include the warning processing unit 45, user's attention can be drawn to the fact that the reliability degree is equal to or less than the threshold.

In the leaked gas detection device D and the leaked gas detection method, one or a plurality of the humidity, the rainfall amount, the wind speed, the solar radiation amount, and the air temperature (typically, the relative humidity and the wind speed in the above description), which influences the reliability degree, is adopted as the meteorological element. Therefore, the reliability degree can be appropriately evaluated.

Note that, in the above-described embodiment, the warning processing unit 45 displays the warning on the display unit 6 with the error display by a message. However, the warning processing unit 45 may cause the display processing unit 46 to fill the range including the leakage position obtained in the leakage position processing unit 43 with the predetermined color (for example, yellow) as the warning. That is, when the reliability degree obtained by the reliability degree processing unit 44 is equal to or less than the predetermined threshold, the warning processing unit 45 causes the display processing unit 46 to fill the range including the leakage position obtained by the leakage position processing unit 43 with the predetermined color such as yellow. According to this configuration, the leaked gas detection D and the leaked gas detection method fills the range including the leakage position obtained in the leakage position processing unit 43 with the predetermined color as the warning. Therefore, the user's attention can be drawn to the fact that the reliability degree is equal to or less than the threshold with visual recognition in the range.

Although the present specification discloses the techniques of various aspects as described above, the main technologies among them are summarized below.

A leaked gas detection device according to one aspect includes an image acquisition unit that acquires an image of a target area, a meteorological element acquisition unit that acquires data related to a meteorological element, a leakage position processing unit that obtains a leakage position of a gas leaked into a space on the basis of the image of the target area acquired in the image acquisition unit, a reliability degree processing unit that obtains a reliability degree that is an index representing the degree of reliability with respect to the leakage position obtained in the leakage position processing unit on the basis of the meteorological element acquired in the meteorological element acquisition unit, and a display processing unit that makes the leakage position obtained in the leakage position processing unit displayable on a display unit in a range including the leakage position, wherein the display processing unit changes a size of the range according to the reliability degree obtained in the reliability degree processing unit. Preferably, in the above-described leaked gas detection device, the image acquisition unit is an interface unit that receives an input of data from an external device, and the interface unit receives an input of the image of the target area from an imaging unit that images the target area to generate the image of the target area as the external device. Preferably, in the above-described leaked gas detection device, the image acquisition unit is an imaging unit that images the target area to generate the image of the garget area. Preferably, in the above-described leaked gas detection device, the meteorological element acquisition unit is an interface unit that receives an input of data from an external device, and the interface unit receives an input of the data related to a meteorological element from a meteorological element measurement unit that measures a predetermined meteorological element as an external device. Preferably, in the above-described leaked gas detection device, the meteorological element acquisition unit is a meteorological element measurement unit that measures a predetermined meteorological element.

Such a leaked gas detection device displays the leakage position obtained in the leakage position processing unit in the range (area) including the leakage position, and further changes the size of the range according to the reliability degree. Therefore, the above-described leaked gas detection device displays the leakage position in the range and thus can reduce the flicker, and can display the reliability of the leakage position including the degree of error with the size of the range. Therefore, a user can more easily recognize the reliability of the leakage position including the degree of error (a difference between a true leakage position and the obtained leakage position) with visual recognition in the size of the range, and can make a more appropriate, judgment as to whether to rush to a site or whether to wait and see according to the reliability degree.

In another aspect, in the above-described leaked gas detection device, the display processing unit changes the size of the range such that the size of the range becomes larger as the reliability degree obtained in the reliability degree processing unit becomes lower.

The leakage position obtained in the leakage position processing unit varies as the reliability degree becomes lower. Such a leaked gas detection device makes the size of the range larger as the reliability degree obtained in the reliability degree processing unit becomes lower, and thus can further reduce the flicker.

In another aspect, the above-described leaked gas detection device further includes a warning processing unit that gives, when the reliability degree obtained in the reliability degree processing unit is equal to or less than a predetermined threshold, a warning informing that the reliability degree is equal to or less than the threshold.

Such a leaked gas detection device further includes the warning processing unit, and thus can draw the user's attention to the fact that the reliability degree is equal to or less than the threshold.

In another aspect, in the above-described leaked gas detection device, the warning processing unit causes the display processing unit to fill the range including the leakage position obtained in the leakage position processing unit with a predetermined color as the warning.

Such a leaked gas detection device fills the range including the leakage position obtained in the leakage position processing unit with the predetermined color as the warning, and therefore can draw the user's attention to the fact that the reliability degree is equal to or less than the threshold with visual recognition in the range.

In another aspect, in the leaked gas detection device, the meteorological element is one or a plurality of humidity, an rainfall amount, wind speed, a solar radiation amount, and air temperature. Preferably, in the case where the meteorological element is the humidity (relative humidity or absolute humidity), the meteorological element measurement unit includes a hygrometer, and the reliability degree becomes smaller as the humidity becomes higher. Preferably, in the case where the meteorological element is the rainfall amount, the meteorological element measurement unit includes a rain gauge, and the reliability degree becomes smaller as the rainfall amount becomes larger. Preferably, in the case where the meteorological element is the wind speed, the meteorological element measurement unit includes an anemometer, and the reliability degree becomes smaller as the wind speed becomes faster. Preferably in the case where the meteorological element is the solar radiation amount, the meteorological element measurement unit includes a pyranometer, and the reliability degree becomes smaller as the solar radiation amount becomes smaller. Preferably, in the case where the meteorological element is the air temperature, the meteorological element measurement unit includes a thermometer, and the reliability degree becomes smaller as a difference between a background temperature of a gas cloud formed with a leaked gas and an air temperature becomes smaller.

Such a leaked gas detection device adopts one or a plurality of the humidity, the rainfall amount, the wind speed, the solar radiation amount, and the air temperature, which influences the reliability degree, as the meteorological element. Therefore, the reliability degree can be appropriately evaluated.

A leaked gas detection method according to another aspect includes an image input step of acquiring an image of a target area, a meteorological element input step of acquiring data related to a meteorological element, a leakage position processing step of obtaining a leakage position of a gas leaked into a space on the basis of the image of the target area acquired in the image input step, a reliability degree processing step of obtaining a reliability degree that is an index representing the degree of reliability with respect to the leakage position obtained in the leakage position processing step on the basis of the meteorological element acquired in the meteorological element input step, and a display processing step of making the leakage position obtained in the leakage position processing step displayable on a display unit in a range including the leakage position, wherein the display processing step changes a size of the range according to the reliability degree obtained in the reliability degree processing step.

Such a leaked gas detection method displays the leakage position obtained in the leakage position processing step in the range including the leakage position, and further changes the size of the range according to the reliability degree. Therefore, the above-described leaked gas detection method displays the leakage position in the range and thus can reduce the flicker, and can display the reliability of the leakage position including the degree of error with the size of the range. Therefore, the user can more easily recognize the reliability of the leakage position including the degree of error with visual recognition in the size of the range, and can make a more appropriate judgment as to whether to rush to the site or whether to wait and see according to the reliability degree.

This application is based on Japanese Patent Application No. 201.5-212505 filed on Oct. 29, 2015, the contents of which are hereby incorporated herein by reference.

To express the present invention, while the present invention has been appropriately and fully described through the embodiments with reference to the drawings in the foregoing, it should be recognized that those skilled in the art can easily modify and/or improve the above-described embodiments. Therefore, it is construed that modified forms and improved forms are included in the scope of claims as long as the modified forms and improved forms implemented by those skilled in the art do not depart from the scope of claims described in the claims.

INDUSTRIAL APPLICABILITY

According to the present invention, a leaked gas detection device and a leaked gas detection method can be provided.

The invention claimed is:
1. A leaked gas detection system comprising:
a display;
a memory; and
a hardware processor which is configured to receive inputs of image data of a target area and meteorological data, and which is configured to execute a program stored in the memory to be configured to:
determine a leakage position of a gas leaked into a space based on the image data;
determine a reliability degree based on the meteorological data, wherein the reliability degree indicates a reliability of the determined leakage position; and
generate an image of the target area for display on the display, the generated image including the determined leakage position as a range of display area in the generated image, and a size of the range of display area being set such that the size changes based on the determined reliability degree.

2. The leaked gas detection system according to claim 1, wherein the hardware processor is configured to set the size of the range of display area in the generated image such that the size increases as the reliability degree decreases.

3. The leaked gas detection system according to claim 2, wherein the hardware processor is further configured to:
determine whether the reliability degree is equal to or less than a predetermined threshold; and
issue a warning when it is determined that the reliability degree is equal to or less than a predetermined threshold.

4. The leaked gas detection system according to claim 3, wherein the hardware processor is configured to issue the warning by generating the image for display on the display such that the determined leakage position is included as the range of display area having a predetermined color.

5. The leaked gas detection system according to claim 4, wherein the meteorological data comprises at least one of humidity, a rainfall amount, wind speed, a solar radiation amount, and air temperature.

6. The leaked gas detection system according to claim 1, wherein the hardware processor is further configured to:
determine whether the reliability degree is equal to or less than a predetermined threshold; and
issue a warning when it is determined that the reliability degree is equal to or less than a predetermined threshold.

7. The leaked gas detection system according to claim 1, wherein the meteorological data comprises at least two different kinds of meteorological data.

8. The leaked gas detection system according to claim 1, wherein the meteorological data comprises at least one of humidity, a rainfall amount, wind speed, a solar radiation amount, and air temperature.

9. The leaked gas detection system according to claim 1, wherein the meteorological data comprises at least one of humidity and wind speed.

10. The leaked gas detection system according to claim 1, wherein the meteorological data comprises humidity and wind speed.

11. The leaked gas detection system according to claim 1, wherein the meteorological data comprises data obtained separately from the image data.

12. The leaked gas detection system according to claim 1, further comprising:
an infrared camera;
a visible light camera; and
at least one meteorological data measurement device which obtains the meteorological data;

wherein the hardware processor is configured to determine the leakage position of the gas using infrared image data obtained by the infrared camera; and wherein the hardware processor is configured to generate the image of the target area using visible image data obtained by the visible light camera.

13. A leaked gas detection method comprising:

receiving inputs of image data of a target area and meteorological data;

determining a leakage position of a gas leaked into a space based on the image data;

determining a reliability degree based on the meteorological data, wherein the reliability degree indicates a reliability of the determined leakage position; and generating an image of the target area for display on a display, the generated image including the determined leakage position as a range of display area in the generated image, and a size of the range of display area being set such that the size changes based on the determined reliability degree.

14. The leaked gas detection method according to claim 13, wherein the size of the range of display area in the generated image is set such that the size increases as the reliability degree decreases.

15. The leaked gas detection method according to claim 13, further comprising:

determining whether the reliability degree is equal to or less than a predetermined threshold; and issuing a warning when it is determined that the reliability degree is equal to or less than a predetermined threshold.

16. The leaked gas detection method according to claim 15, wherein issuing the warning comprises generating the image for display on the display such that the determined leakage position is included as the range of display area having a predetermined color.

17. The leaked gas detection method according to claim 13, wherein the meteorological data comprises at least one of humidity, a rainfall amount, wind speed, a solar radiation amount, and air temperature.

18. The leaked gas detection method according to claim 13, wherein the meteorological data comprises at least one of humidity and wind speed.

19. The leaked gas detection method according to claim 13, wherein the meteorological data comprises humidity and wind speed.

20. The leaked gas detection method according to claim 13, wherein the meteorological data comprises data obtained separately from the image data.

* * * * *